(12) United States Patent
Yao

(10) Patent No.: US 10,221,929 B2
(45) Date of Patent: Mar. 5, 2019

(54) TRANSMISSION DEVICE FOR POWER-DRIVEN CUTTING TOOL

(71) Applicant: JYEN HERR ENTERPRISE CO., LTD., Changhua, Changhua (TW)

(72) Inventor: Kevin Yao, Changhua (TW)

(73) Assignee: JYEN HERR ENTERPRISE CO., LTD., Changhua, Changhua (TW)

( * ) Notice: Subject to any disclaimer, the term of this patent is extended or adjusted under 35 U.S.C. 154(b) by 449 days.

(21) Appl. No.: 15/213,658

(22) Filed: Jul. 19, 2016

(65) Prior Publication Data

US 2017/0314660 A1 Nov. 2, 2017

(30) Foreign Application Priority Data

Apr. 29, 2016 (TW) .............................. 105113431 A

(51) Int. Cl.

| F16H 21/22 | (2006.01) |
|---|---|
| F16H 37/12 | (2006.01) |
| F16C 3/22 | (2006.01) |
| B23D 51/16 | (2006.01) |
| F16C 7/02 | (2006.01) |

(Continued)

(52) U.S. Cl.
CPC .......... *F16H 37/124* (2013.01); *B23D 51/16* (2013.01); *F16C 3/22* (2013.01); *F16C 7/02* (2013.01); *F16C 19/06* (2013.01); *F16C 19/54* (2013.01); *F16C 2310/00* (2013.01); *F16C 2322/50* (2013.01); *F16H 1/14* (2013.01); *F16H 21/22* (2013.01)

(58) Field of Classification Search
CPC .......... F16H 37/124; F16C 3/22; F16C 19/06; F16C 19/54
See application file for complete search history.

(56) References Cited

U.S. PATENT DOCUMENTS

| 1,842,302 A * | 1/1932 | Henry | .................... B25D 11/12 |
| | | | 101/3.1 |
| 2,278,657 A * | 4/1942 | Kline | ..................... B24B 35/00 |
| | | | 451/164 |

(Continued)

FOREIGN PATENT DOCUMENTS

TW          M450967          4/2013

*Primary Examiner* — David M Fenstermacher
(74) *Attorney, Agent, or Firm* — Muncy, Geissler, Olds & Lowe, P.C.

(57) ABSTRACT

A transmission device for a power-driven cutting tool includes a base, a transmission component, a linking component, a shaft component and a link component. The base has a through cavity, a sleeve and a receiving portion. The transmission component is penetratingly disposed in the through cavity, so as to couple the transmission component and the base together. The linking component is penetratingly disposed in the sleeve, so as to couple the linking component and the base together. The shaft component and the link component are disposed in the base. A power source drives the linking component and thereby sequentially drives the shaft component, link component, and transmission component, allowing a cutter of the power-driven cutting tool to undergo reciprocating displacements along a linear path for performing a cutting operation. The transmission device features enhanced structural rigidity, allowing the cutter to move back and forth along a linear track.

11 Claims, 3 Drawing Sheets

(51) Int. Cl.
*F16C 19/06* (2006.01)
*F16C 19/54* (2006.01)
*F16H 1/14* (2006.01)

(56) References Cited

U.S. PATENT DOCUMENTS

| | | | | |
|---|---|---|---|---|
| 5,971,044 A * | 10/1999 | Valentin | ................ | B25D 11/10 |
| | | | | 144/193.1 |
| 2005/0109137 A1* | 5/2005 | Hartmann | ............. | B23D 51/16 |
| | | | | 74/25 |
| 2005/0139021 A1* | 6/2005 | Shuhua | ................ | B23D 51/02 |
| | | | | 74/49 |
| 2008/0155817 A1* | 7/2008 | Lock | ........................ | B26B 7/00 |
| | | | | 29/798 |
| 2008/0169114 A1* | 7/2008 | Wuensch | ............... | B24B 23/04 |
| | | | | 173/198 |
| 2009/0320625 A1* | 12/2009 | Kildevaeld | ........... | B23D 51/10 |
| | | | | 74/25 |
| 2010/0000288 A1* | 1/2010 | Barezzani | ............ | B25B 27/146 |
| | | | | 72/453.15 |
| 2010/0101101 A1* | 4/2010 | Oberheim | ............. | B23D 51/20 |
| | | | | 30/393 |
| 2014/0260720 A1* | 9/2014 | Hartranft | ............... | F16H 21/22 |
| | | | | 74/42 |
| 2015/0107383 A1* | 4/2015 | Duesselberg | ........... | F16H 21/22 |
| | | | | 74/25 |
| 2015/0367494 A1* | 12/2015 | Wang | ..................... | B25F 5/006 |
| | | | | 30/392 |

\* cited by examiner

TRANSMISSION DEVICE FOR POWER-DRIVEN CUTTING TOOL

BACKGROUND OF THE INVENTION

Field of the Invention

The present invention relates to manual cutting tools for use in harvest and, more particularly, to a transmission device for a power-driven cutting tool.

Description of the Prior Art

To prune trees or reap crops (palm fruits) at a considerable height, a fixed cutter is disposed at the front end of a stick of a conventional tool and is extensible vertically by means of the stick. However, it is time-consuming, exhausting and inconvenient to perform a cutting operation with the tool.

In view of the aforesaid drawback of the prior art, the inventor of the present invention holds a Taiwan patent M450967 directed to a transmission device for a power-driven cutting tool, characterized in that: an arcuate bearing surface of a bushing guides an arcuate surface of a sliding segment of a transmission rod in allowing the transmission rod to slide back and forth along a linear path smoothly, thereby reducing vibration and noise. However, the aforesaid structure still has a disadvantage, that is, internal structures of a base vibrate and shake under inertia to therefore predispose the cutter to imprecise positioning. Accordingly, it is important to overcome the aforesaid drawbacks of the prior art.

SUMMARY OF THE INVENTION

It is an objective of the present invention to provide a transmission device for a power-driven cutting tool, characterized in that the transmission device features enhanced structural rigidity conducive to reduction of vibration and noise and thus enhancement of smooth and stable operation.

In order to achieve the above and other objectives, the present invention provides a transmission device for a power-driven cutting tool, mounted at a power output end of the power-driven cutting tool to drive a cutter of the power-driven cutting tool to undergo reciprocating displacements in order to perform a cutting operation. The transmission device comprises a base, a transmission component, a linking component, a shaft component and a link component. The base has a through cavity, a sleeve and a receiving portion. The transmission component has a transmission rod and a bushing. The bushing fits around the transmission rod. The transmission rod pivotally coupled to the at least one bushing is penetratingly disposed in the through cavity, so as to couple the transmission component and the base together. The linking component has a linking rod, a driving gear and a bearing. The driving gear is connected to the linking rod front end. The bearing is disposed at the rear end of the driving gear and fitted around the linking rod. The linking rod pivotally coupled to the bearing is penetratingly disposed in the sleeve, so as to couple the linking component and the base together. The shaft component is disposed at a receiving portion of the base. The shaft component has a shaft, a transmission gear and an eccentric segment. The transmission gear fits around the shaft. The transmission gear meshes perpendicularly with the driving gear. The eccentric segment is disposed at the front end of the transmission gear. The shaft is pivotally and eccentrically disposed at the eccentric segment. The link component is disposed at the receiving portion of the base. The link component has a link, a first bearing and a second bearing. The first bearing and the transmission rod are coupled together. The second bearing fits around the eccentric segment of the shaft component. The link component drives the transmission component to undergo reciprocating displacements along a linear path.

In an embodiment of the present invention, the transmission rod, the linking rod and the link are coaxial and perpendicular to the shaft.

In an embodiment of the present invention, the transmission rod has two paired lug plates. The paired lug plates are disposed at the rear end of the linking rod and two sides of the first bearing of the link component, respectively. An axial pin is penetratingly disposed in the first bearing and the paired lug plates of the transmission rod, so as to couple the transmission component and the link component together.

In an embodiment of the present invention, the shaft component has a plurality of bearings and a washer. The bearings are disposed at the front and rear ends of the shaft, respectively. A first protruding portion is disposed at one of the bearings. A second protruding portion is disposed at one of the bearings. The washer fits around the shaft. The washer is disposed between the eccentric segment and one of the bearings.

In an embodiment of the present invention, the transmission device has a cover and a plurality of fastening components, with the cover corresponding in position to the base and fastened to the base by the fastening components to cover the based, thereby providing a hermetic seal to the shaft and the link in the base.

In an embodiment of the present invention, the transmission rod has a mounting portion which the cutter of the power-driven cutting tool is mounted on.

In an embodiment of the present invention, the linking rod has therein a connecting portion for allowing the power output end and a stick to be connectedly disposed at the power-driven cutting tool.

In an embodiment of the present invention, the front end of the shaft has the first protruding portion, and the rear end of the shaft has the second protruding portion. The first protruding portion of the shaft protrudes from the front end of the eccentric segment. The second protruding portion of the shaft protrudes from the rear end of the transmission gear. The transmission gear has a teeth portion. The teeth portion faces the first protruding portion of the shaft.

In an embodiment of the present invention, the front and rear ends of the link have a first annular portion and a second annular portion, respectively. The first bearing is disposed in the first annular portion and fitted inside the first annular portion. The second bearing is disposed in the second annular portion and fitted inside the second annular portion.

In an embodiment of the present invention, the bushing is made of metal, including copper, iron or a combination thereof.

Fine structures, features, assembly and operation of a transmission device for a power-driven cutting tool according to present invention are illustrated with embodiments and described below. However, persons skilled in the art understand that the description and specific embodiments of the present invention are illustrative rather than restrictive of the claims of the present invention.

Directional wordings, such as "front", "rear", "left", "right", used herein should be interpreted as usual with reference to common directions.

DETAILED DESCRIPTION OF THE EMBODIMENT OF THE INVENTION

Figure 1:
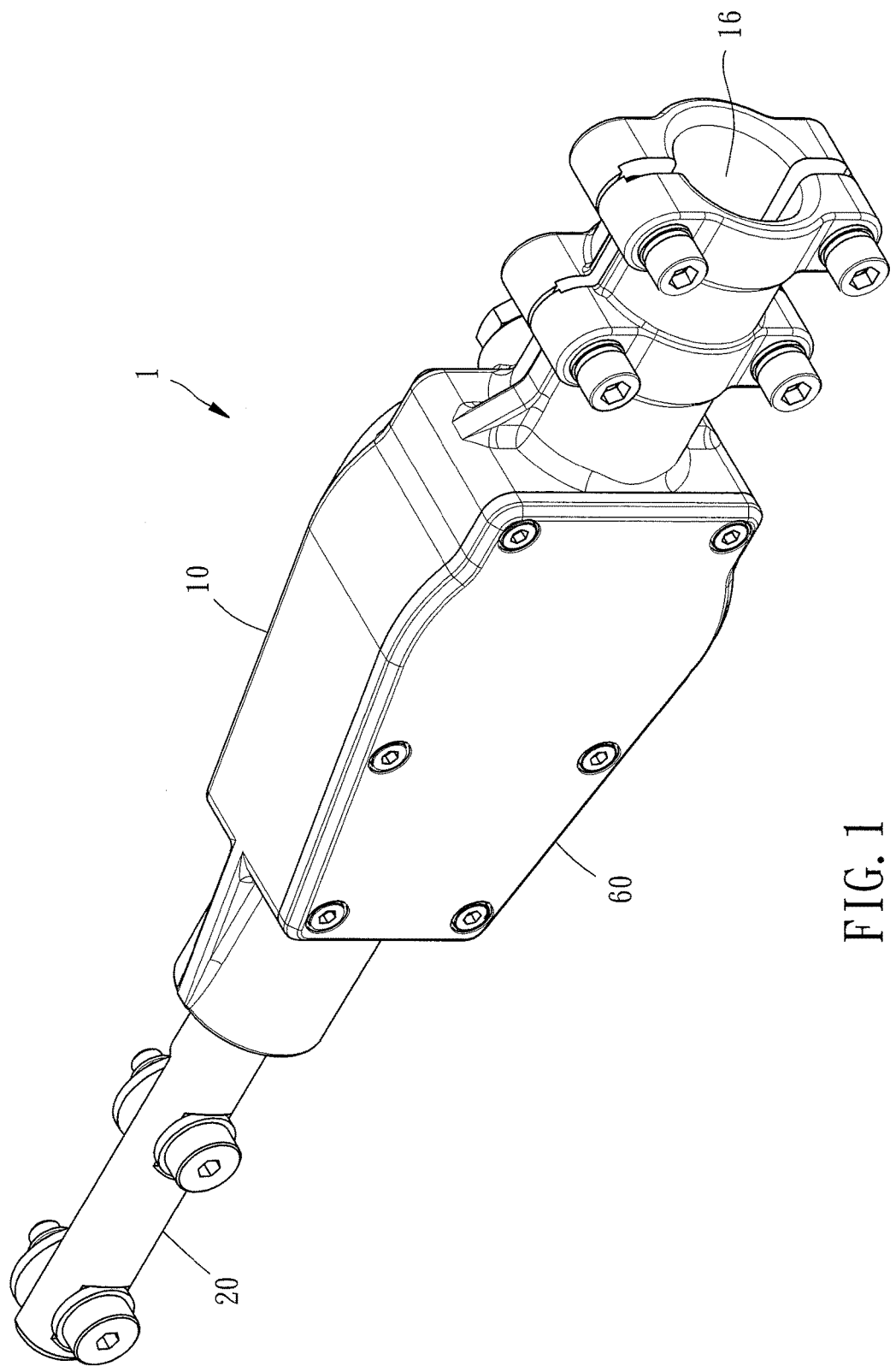
FIG. 1 is a perspective view of a transmission device for a power-driven cutting tool according to the present invention.
Figure 2:
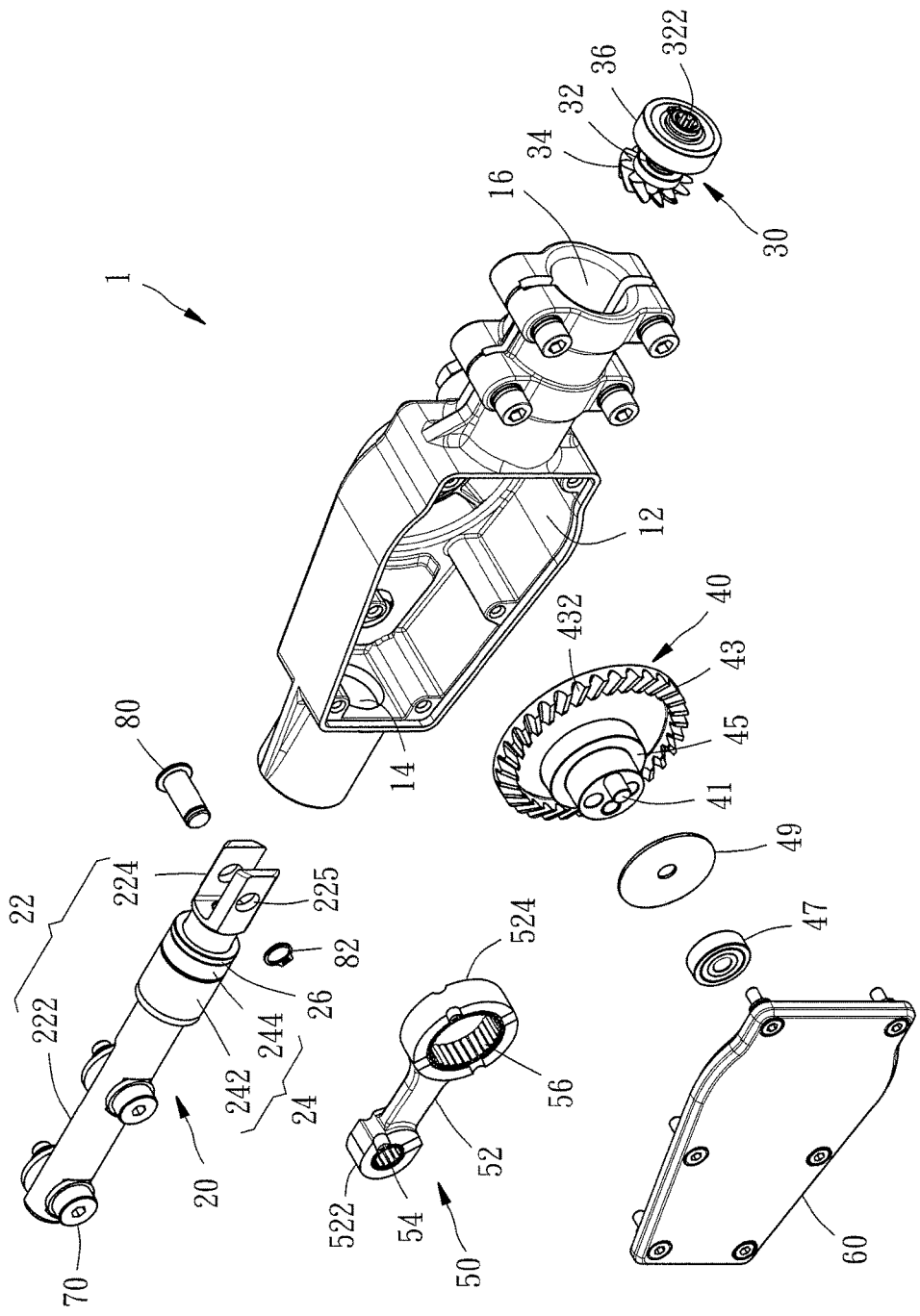
FIG. 2 is an exploded view of a transmission device for a power-driven cutting tool according to the present invention.
Figure 3:
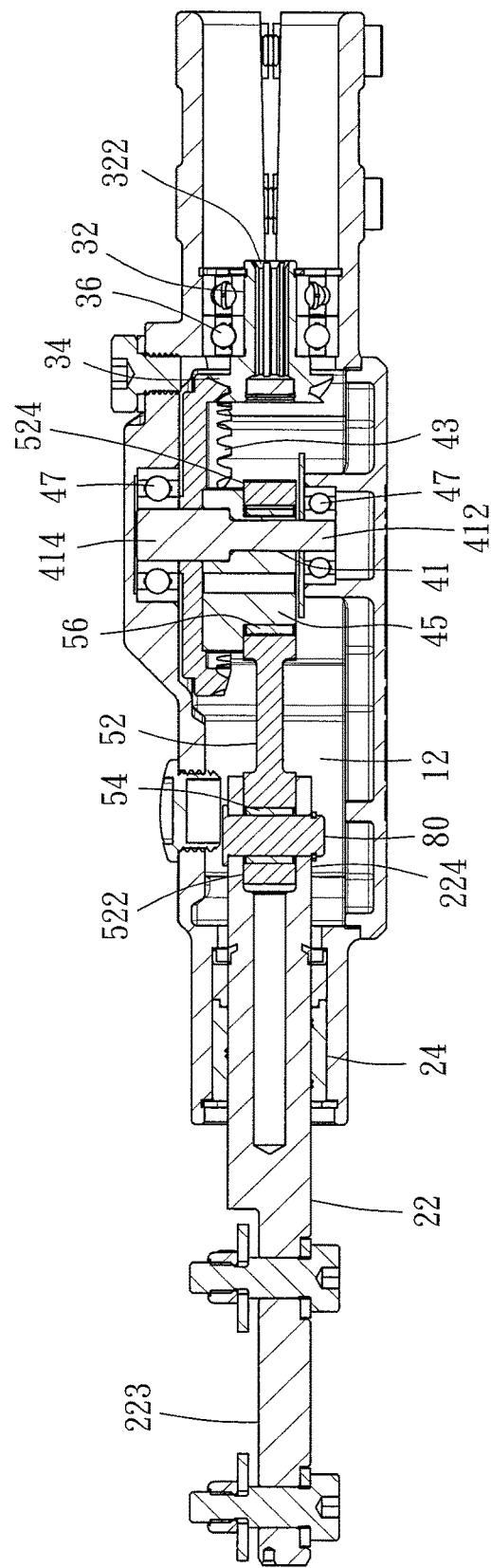
FIG. 3 is cross-sectional view of a transmission device for a power-driven cutting tool according to the present invention.

Referring to FIG. 1 through FIG. 3, a transmission device 1 for a power-driven cutting tool according to the present invention is mounted at a power output end of the power-driven cutting tool to drive a cutter of the power-driven cutting tool to undergo reciprocating displacements in order to perform a cutting operation. The transmission device 1 comprises a base 10, a transmission component 20, a linking component 30, a shaft component 40, a link component 50 and a cover 60.

The base 10 has a receiving portion 12, a through cavity 14 and a sleeve 16. The receiving portion 12 is provided in the form of a receiving space for enclosing and protecting internal components. The through cavity 14 is disposed at the front end of the receiving portion 12 and is in communication with the receiving portion 12. The sleeve 16 is disposed at the rear end of the receiving portion 12 and is in communication with the receiving portion 12. The through cavity 14 and the sleeve 16 are opposite in position so that the receiving portion 12 is in forward communication with the through cavity 14 and in rearward communication with the sleeve 16, thereby forming a channel which penetrates the base 10 axially.

The transmission component 20 has a transmission rod 22 and at least one bushing 24. The transmission rod 22 is slender. The front end of the transmission rod 22 has a mounting portion 222. Two sides of the rear end of the transmission rod 22 have two paired lug plates 224, respectively. The cutter of the power-driven cutting tool is mounted on the mounting portion 222. The mounting portion 222 has a recess 223 and a plurality of fastening components 70. The cutter of the power-driven cutting tool is placed in the recess 223. The fastening components 70 fasten the cutter in place. The two lug plates 224 each have a through hole 225. The two lug plates 224 each have a U-shaped cross section. An axial pin 80 not only penetrates the through holes 225 of the lug plates 224 to fix the transmission rod 22 in place but also engages therewith so that the transmission rod 22 thus assembled is structurally firmed. The at least one bushing 24 is ring-shaped and fits around the lower half segment of the transmission rod 22 to reduce friction and abrasion of the transmission rod 22 in operation. Preferably, the transmission component 20 has two bushings 24, namely a front bushing 242 and a rear bushing 244, both of which are made of metal. The front bushing 242 is made of copper, whereas the rear bushing 244 is made of iron, but the present invention is not limited thereto. The at least one bushing 24 fits around the transmission rod 22, and then the transmission rod 22 pivotally coupled to the at least one bushing 24 is penetratingly disposed in the through cavity 14, so as to couple the transmission component 20 and the base 10 together. The transmission component 20 further has an oil seal 26. The oil seal 26 is disposed at the rear end of the at least one bushing 24 to seal the through cavity 14 of the base 10 hermetically and press against the transmission component 20 and the base 10 tightly. As soon as the transmission component 20 gets coupled to the base 10, the mounting portion 222 of the transmission rod 22 extends outward from the front of the base 10. The two lug plates 224 of the transmission rod 22 are disposed in the receiving portion 12 of the base 10. The at least one bushing 24 and the oil seal 26 are disposed in the through cavity 14 of the base 10.

The linking component 30 has a linking rod 32, a driving gear 34 and a bearing 36. The linking rod 32 is hollow cored and has therein a connecting portion 322 connected to the power output end of the power-driven cutting tool. The driving gear 34 is conically shaped. The driving gear 34 is connected to the front end of the linking rod 32 to transmit power. The bearing 36 is disposed at the rear end of the driving gear 34 and fitted around the linking rod 32, and then the linking rod 32 pivotally coupled to the bearing 36 is penetratingly disposed in the sleeve 16, so as to couple the linking component 30 and the base 10 together. Coupling the linking component 30 and the base 10 together not only positions the driving gear 34 in the receiving portion 12 of the base 10 but also positions the linking rod 32 and the bearing 36 in the sleeve 16 of the base 10.

The shaft component 40 is disposed at the receiving portion 12 of the base 10 and driven by a power source to rotate. The shaft component 40 has a shaft 41, a transmission gear 43, an eccentric segment 45 and a plurality of bearings 47. The shaft 41 has a front end provided with a first protruding portion 412 and a rear end provided with a second protruding portion 414. The transmission gear 43 is conically shaped and fits around the shaft 41. The transmission gear 43 has a teeth portion 432. The teeth portion 432 faces the front end of the shaft 41 so that the transmission gear 43 meshes perpendicularly with the driving gear 34. The shaft 41 is pivotally and centrally disposed at the transmission gear 43 so that the second protruding portion 414 of the shaft 41 protrudes from the rear end of the transmission gear 43. The eccentric segment 45 consists of two stacked round blocks. The eccentric segment 45 is disposed at the front end of the transmission gear 43. The shaft 41 is pivotally and eccentrically disposed at the eccentric segment 45 so that the first protruding portion 412 of the shaft 41 protrudes from the front end of the eccentric segment 45. The bearings 47 are disposed at the front and rear ends of the shaft 41, respectively. The first protruding portion 412 is pivotally disposed at one of the bearings 47. The second protruding portion 414 is pivotally disposed at one of the bearings 47. The shaft component 40 further has a washer 49. The washer 49 fits around the shaft 41 and is disposed between the eccentric segment 45 and the bearings 47. As soon as the power output end of the power-driven cutting tool drives the linking component 30 to operate, the transmission gear 43 of the shaft component 40 meshes perpendicularly with the driving gear 34 of the linking component 30, thereby driving the shaft component 40 to rotate and operate.

The link component 50 is disposed at the receiving portion 12 of the base 10. The link component 50 has a link 52, a first bearing 54 and a second bearing 56. The link 52 consists of two connected ring-shaped structures. The front end of the link 52 has a first annular portion 522. The rear end of the link 52 has a second annular portion 524. The first bearing 54 is disposed in the first annular portion 522 and fitted inside the first annular portion 522. The two lug plates 224 of the transmission rod 22 are engaged with the first annular portion 522 of the link 52. Then, an axial pin 80 penetrates the two lug plates 224 and the first bearing 54. Eventually, a retaining ring 82 fixes the axial pin 80 in place, so as to couple the link component 50 and the transmission component 20 together. The second bearing 56 is not only disposed in the second annular portion 524 and fitted inside the second annular portion 524 but also fitted around the eccentric segment 45 of the shaft component 40, so as to couple the link component 50 and the shaft component 40 together. As soon as the eccentric segment 45 of the shaft component 40 is driven to operate, the link component 50 drives the transmission component 20 to undergo reciprocating displacements along a linear path; meanwhile, the link 52, the transmission rod 22 and the linking rod 32 are coaxial.

The cover 60 corresponds in position to the base 10. The cover 60 is fastened to the base 10 by the fastening components 70 to cover the base 10, thereby providing a hermetic seal to the shaft component 40 and the link component 50 in the base 10.

Therefore, in practice, a power source (not shown) is disposed in the sleeve 16 of the base 10. The power source drives the linking component 30. The driving gear 34 of the linking component 30 meshes perpendicularly with the transmission gear 43 of the shaft component 40 and thus drives the shaft component 40 to operate. Furthermore, the eccentric segment 45 of the shaft component 40 drives the link component 50 to move back and forth, whereas the link component 50 drives the transmission component 20 and the cutter to undergo reciprocating displacements along a linear path in order to perform a cutting operation. At this point in time, the transmission rod 22, the linking rod 32 and the link 52 are coaxial. Hence, the transmission device 1 features enhanced structural rigidity to thereby allow the cutter to move back and forth along a linear track steadily, prevent the internal structures of the base 10 from vibrating and shaking under inertia, reduce noise greatly, and render a cutting process smooth and stable.

In conclusion, the transmission device 1 for a power-driven cutting tool, provided by the present invention, features structural rigidity conducive to reduction of vibration and enhancement of ease of use.

What is claimed is:

1. A transmission device for a power-driven cutting tool, mounted at a power output end of the power-driven cutting tool to drive a cutter of the power-driven cutting tool to undergo reciprocating displacements in order to perform a cutting operation, the transmission device comprising:
    a base having a through cavity, a sleeve and a receiving portion;
    a transmission component having a transmission rod and at least one bushing, with the at least one bushing fitted around the transmission rod, wherein the transmission rod pivotally coupled to the at least one bushing is penetratingly disposed in the through cavity, so as to couple the transmission component and the base together;
    a linking component having a linking rod, a driving gear and a bearing, with the driving gear connected to a front end of the linking rod, and the bearing disposed at a rear end of the driving gear and fitted around the linking rod, wherein the linking rod pivotally coupled to the bearing is penetratingly disposed in the sleeve, so as to couple the linking component and the base together;
    a shaft component disposed at a receiving portion of the base and having a shaft, a transmission gear, and an eccentric segment, with the transmission gear fitting around the shaft and meshing perpendicularly with the driving gear, the eccentric segment disposed at a front end of the transmission gear, and the shaft pivotally and eccentrically disposed at the eccentric segment; and
    a link component disposed at the receiving portion of the base and having a link, a first bearing and a second bearing, with the first bearing coupled to the transmission rod, and the second bearing fitted around the eccentric segment of the shaft component, wherein the link component drives the transmission component to undergo reciprocating displacements along a linear path.

2. The transmission device for a power-driven cutting tool according to claim 1, wherein the transmission rod, the linking rod and a link are coaxial and perpendicular to the shaft.

3. The transmission device for a power-driven cutting tool according to claim 1, wherein the transmission rod has two paired lug plates disposed at a rear end of the linking rod and on two sides of the first bearing of the link component, respectively, wherein an axial pin is penetratingly disposed in the first bearing and the paired lug plates of the transmission rod, so as to couple the transmission component and the link component together.

4. The transmission device for a power-driven cutting tool according to claim 1, wherein the shaft component has a plurality of bearings and a washer, with the bearings disposed at front and rear ends of the shaft, respectively, a first protruding portion pivotally disposed at one of the bearings, a second protruding portion pivotally disposed at one of the bearings, and the washer fitted around the shaft and disposed between the eccentric segment and one of the bearings.

5. The transmission device for a power-driven cutting tool according to claim 1, wherein the transmission device has a cover and a plurality of fastening components, with the cover corresponding in position to the base and being fastened to the base by the fastening components to cover the base by the cover, thereby providing a hermetic seal to the shaft and a link in the base.

6. The transmission device for a power-driven cutting tool according to claim 1, wherein the transmission rod has a mounting portion which the cutter of the power-driven cutting tool is mounted on.

7. The transmission device for a power-driven cutting tool according to claim 1, wherein the linking rod has therein a connecting portion connected to the power output end and a stick of the power-driven cutting tool.

8. The transmission device for a power-driven cutting tool according to claim 1, wherein the shaft has a front end provided with a first protruding portion protruding from a front end of the eccentric segment and a rear end provided with a second protruding portion protruding from a rear end of the transmission gear.

9. The transmission device for a power-driven cutting tool according to claim 8, wherein the transmission gear has a teeth portion facing the first protruding portion of the shaft.

10. The transmission device for a power-driven cutting tool according to claim 1, wherein front and rear ends of a link have a first annular portion and a second annular portion, respectively, the first bearing is disposed in the first annular portion and fitted inside the first annular portion, and the second bearing is disposed in the second annular portion and fitted inside the second annular portion.

11. The transmission device for a power-driven cutting tool according to claim 1, wherein the at least one bushing is made of metal, including one of copper, iron and a combination thereof.

* * * * *